(12) United States Patent
Buslepp et al.

(10) Patent No.: US 7,526,375 B2
(45) Date of Patent: Apr. 28, 2009

(54) TORQUE BASED FUEL CUT-OFF

(75) Inventors: Kenneth J. Buslepp, Brighton, MI (US);
Louis A. Avallone, Milford, MI (US);
Stuart R. Smith, Howell, MI (US);
Donovan L. Dibble, Utica, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 122 days.

(21) Appl. No.: 11/684,998

(22) Filed: Mar. 12, 2007

(65) Prior Publication Data

US 2008/0223334 A1    Sep. 18, 2008

(51) Int. Cl.
*G06F 19/00* (2006.01)
*F02M 51/00* (2006.01)
*F02D 17/04* (2006.01)

(52) U.S. Cl. .................. 701/112; 701/104; 701/110; 123/198 DB; 123/481

(58) Field of Classification Search ......... 701/101–105, 701/110–113, 54; 123/325, 333, 350, 403, 123/481, 493, 198 DB, 198 F, 478, 480
See application file for complete search history.

(56) References Cited

U.S. PATENT DOCUMENTS

| 5,038,883 | A  | * | 8/1991  | Kushi et al. ................ 123/333 |
| 5,562,086 | A  | * | 10/1996 | Asada et al. .............. 123/198 F |
| 6,087,734 | A  | * | 7/2000  | Maeda et al. .............. 180/65.2 |
| 6,876,918 | B2 | * | 4/2005  | Kabe et al. .................. 701/110 |
| 6,907,871 | B2 | * | 6/2005  | Fukusako et al. ........ 123/198 F |
| 7,305,300 | B2 | * | 12/2007 | Gibson et al. .............. 701/110 |
| 2006/0293841 | A1 | * | 12/2006 | Hrovat et al. ............. 701/200 |

FOREIGN PATENT DOCUMENTS

| JP | 02-233851 A    | * | 9/1990  | ............ 123/493 |
| JP | 11227592 A     | * | 8/1999  | ........ 123/198 DB |
| JP | 2001-271690 A  | * | 10/2001 | ............ 123/493 |

* cited by examiner

*Primary Examiner*—Willis R Wolfe, Jr.

(57) ABSTRACT

An engine control system is provided. The system includes: an engine torque module that estimates torque output based on charge energy; and a cylinder mode module that controls fuel cut-off and adjusts spark timing to the engine based on the torque output.

17 Claims, 5 Drawing Sheets

TORQUE BASED FUEL CUT-OFF

FIELD

The present disclosure relates to engine control systems and methods and more particularly to systems and methods for controlling fuel cut-off based on engine torque.

BACKGROUND

The statements in this section merely provide background information related to the present disclosure and may not constitute prior art.

Conventional internal combustion engine systems disable cylinder fueling when a torque demand of the engine is at or below zero. This control feature of the engine system is sometimes referred to as deceleration fuel cut-off (DFCO). DFCO provides the engine system with opportunities to cool one or more catalytic converters of the system and opportunities to reduce fuel consumption during the drive cycle.

Active fuel management engines deactivate one or more cylinders under specific low load operating conditions. For example, an eight cylinder engine can be operated using four cylinders to improve fuel economy by reducing pumping losses. Operation using all of the engine cylinders is referred to as an "activated" mode. Conversely, operation using less than all of the cylinders of the engine (i.e. one or more cylinders are not active) is referred to as a "deactivated" mode.

In the deactivated mode, fuel not delivered to selected cylinders. As a result, there is less drive torque available to drive the vehicle driveline and accessories (e.g., alternator, coolant pump, A/C compressor). However, engine efficiency is increased as a result of decreased air pumping losses due to the deactivated cylinders not taking in and compressing fresh intake air.

The opportunity to take advantage of the potential benefits of cutting off fuel to a cylinder for either DFCO or AFM is reduced by drivability concerns associated with transitioning into and out of this zero fueling mode.

SUMMARY

Accordingly, an engine control system is provided. The system includes: an engine torque module that estimates torque output based on charge energy, and a cylinder mode module that controls fuel cut-off and spark timing to the engine based on the torque output.

In other features, a method of controlling fuel cut-off to an internal combustion engine is provided. The method includes: estimating torque output based on charge energy, and controlling fuel cut-off to the engine based on the estimated torque output and exhaust oxygen content.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
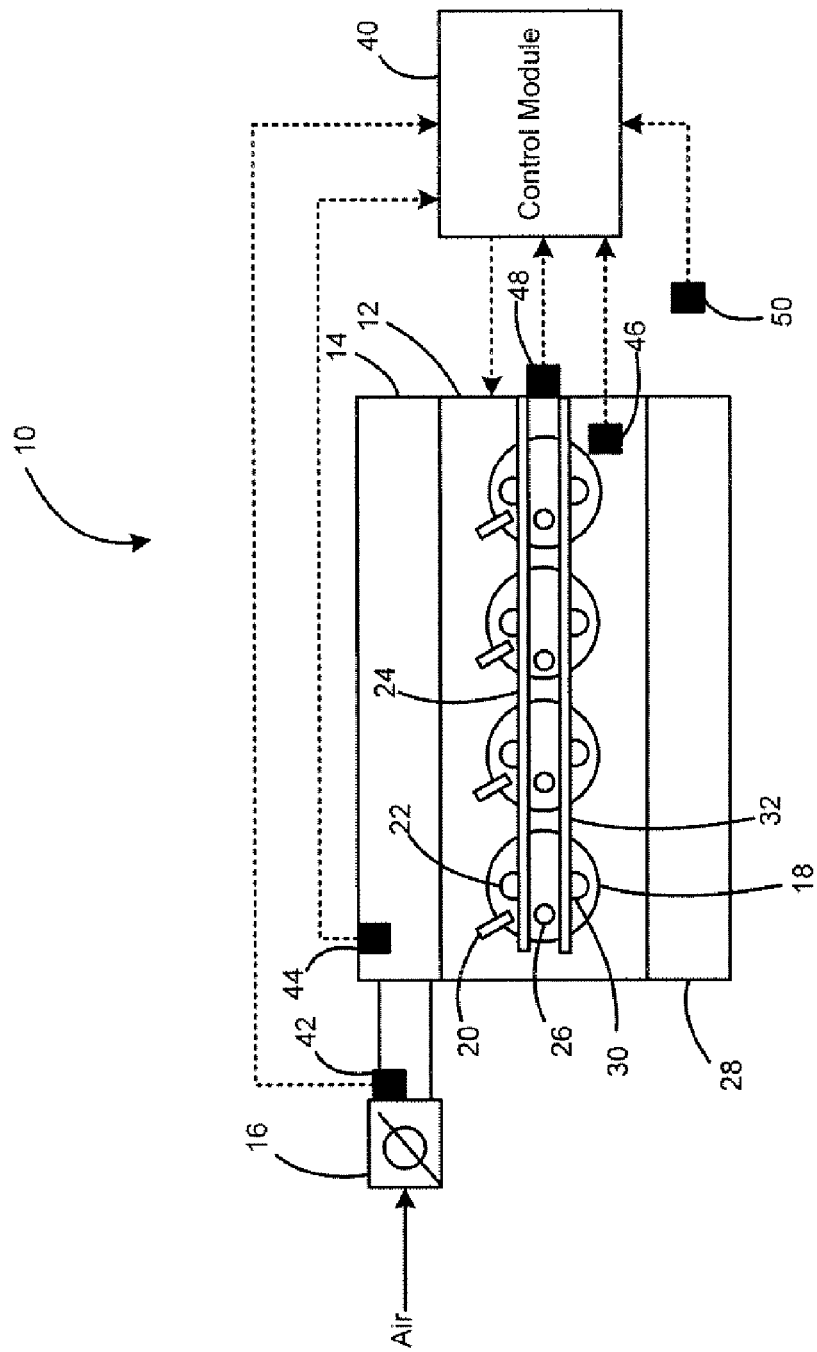
FIG. 1 is a functional block diagram illustrating an engine system.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an engine system 10 includes an engine 12 that combusts an air and fuel mixture to produce drive torque. Air is drawn into an intake manifold 14 through a throttle 16. The throttle 16 regulates mass air flow into the intake manifold 14. Air within the intake manifold 14 is distributed into cylinders 18. Although four cylinders 18 are illustrated, it can be appreciated that the engine 12 can have a plurality of cylinders including, but not limited to, 2, 3, 5, 6, 8, 10, 12 and 16 cylinders. Although the cylinders 18 are shown to be in an inline configuration, it can be appreciated that the cylinders 18 can alternatively be implemented in a v-shaped configuration.

A fuel injector 20 injects fuel that is combined with the air as it is drawn into the cylinder 18 through an intake port. An intake valve 22 selectively opens and closes to enable the air/fuel mixture to enter the cylinder 18. The intake valve position is regulated by an intake camshaft 24. A piston (not shown) compresses the air/fuel mixture within the cylinder 18. A spark plug 26 initiates combustion of the air/fuel mixture, driving the piston in the cylinder 18. The piston drives a crankshaft (not shown) to produce drive torque. Combustion exhaust within the cylinder 18 is forced out through an exhaust manifold 28 when an exhaust valve 30 is in an open position. The exhaust valve position is regulated by an exhaust camshaft 32. The exhaust is treated in an exhaust system. Although single intake and exhaust valves 22,30 are illustrated, it can be appreciated that the engine 12 can include multiple intake and exhaust valves 22,30 per cylinder 18.

The engine system 10 can include an intake cam phaser (not shown) and/or an exhaust cam phaser (not shown) that respectively regulate the rotational timing of the intake and exhaust camshafts 24,32. More specifically, the timing or phase angle of the respective intake and exhaust camshafts 24,32 can be retarded or advanced with respect to each other or with respect to a location of the piston within the cylinder 18 or crankshaft position. In this manner, the position of the intake and exhaust valves 22,30 can be regulated with respect to each other or with respect to a location of the piston within the cylinder 18. By regulating the position of the intake valve 22 and the exhaust valve 30, the quantity of air/fuel mixture ingested into the cylinder 18 and therefore the engine torque is regulated.

The control module 40 controls one or more of the aforementioned components of the engine system 10 based on one or more sensory inputs. A mass airflow sensor 42 generates an airflow signal based on the mass of air flowing into the engine 12. A manifold absolute pressure sensor 44 generates a MAP signal based on an absolute pressure within the intake manifold 14. An engine coolant temperature sensor 46 generates a coolant temperature signal based on a temperature of coolant fluid within the engine 12. An engine speed sensor 48 generates an engine speed signal based on a rotational speed of the crankshaft (not shown). A barometric pressure sensor 50 generates a barometric pressure signal based on a pressure of the atmosphere. The control module 40 receives the above mentioned signals and controls fuel and air to the cylinders 18 based on the torque based fuel cut-off methods and systems as disclosed herein.

Figure 2:
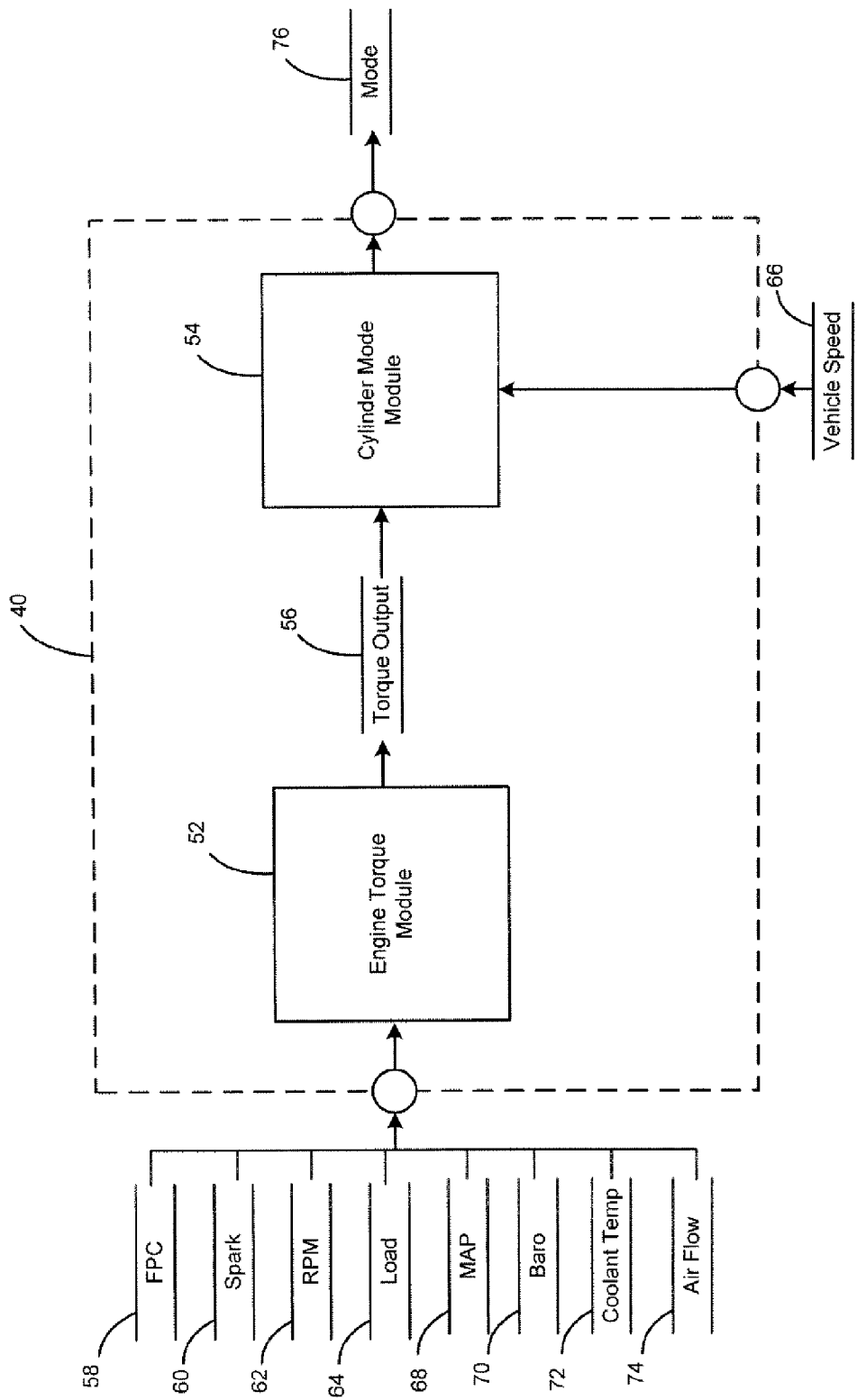
FIG. 2 is a dataflow diagram illustrating a torque based fuel cut-off (FCO) system.

Referring now to FIG. 2, a dataflow diagram illustrates various embodiments of a torque based fuel cut-off (FCO) system that may be embedded within the control module 40. Various embodiments of torque based FCO systems according to the present disclosure may include any number of sub-modules embedded within the control module 40. The sub-modules shown may be combined and/or further partitioned to similarly control the engine 12. Inputs to the FCO system may be sensed from the engine system 10 (FIG. 1), received from other control modules (not shown), and/or determined by other sub-modules (not shown) within the control module 40. In various embodiments, the control module of FIG. 2 includes an engine torque module 52 and a cylinder mode module 54.

The engine torque module 52 receives as input fuel per cylinder (FPC) 58, spark timing 60, engine speed (RPM) 62, parasitic load (LOAD) 64, manifold absolute pressure (MAP) 68, barometric pressure 70, coolant temperature 72, and airflow 74. The engine torque module 52 estimates a torque output 56 by estimating a charge energy and based on the above mentioned inputs. More particularly, the engine torque module 52 estimates a charge energy based on FPC 58 and spark 60; estimates an indicated base torque based on the charge energy; and estimates a pumping work based on MAP 68 and barometric pressure 70. The engine torque module approximates a torque output 56 based on the indicated torque, the pumping work, and an adaptive friction term. The friction term is adaptively corrected based on torque requirements at known load conditions. The friction term can be determined based on coolant temperature 72, airflow 74, engine speed 62, and parasitic load 64.

The cylinder mode module 54 uses the torque output 56 to determine the degree of torque management, or torque smoothing, required to provide a seamless transition between deactivated and fully activated fueling modes. A fuel cut-off mode 76 is selectively determined based on the torque output 56 and vehicle speed 66. The use of available charge energy as the primary control parameter for torque output 56 eliminates flow variation as a possible detractor to drive-ability during FCO mode transitioning. Further granularity over torque can be obtained by modifying the desired spark timing. This would also allow enabling more cylinders when exhaust oxygen content is limited by exhaust emission constraints.

Figure 3:
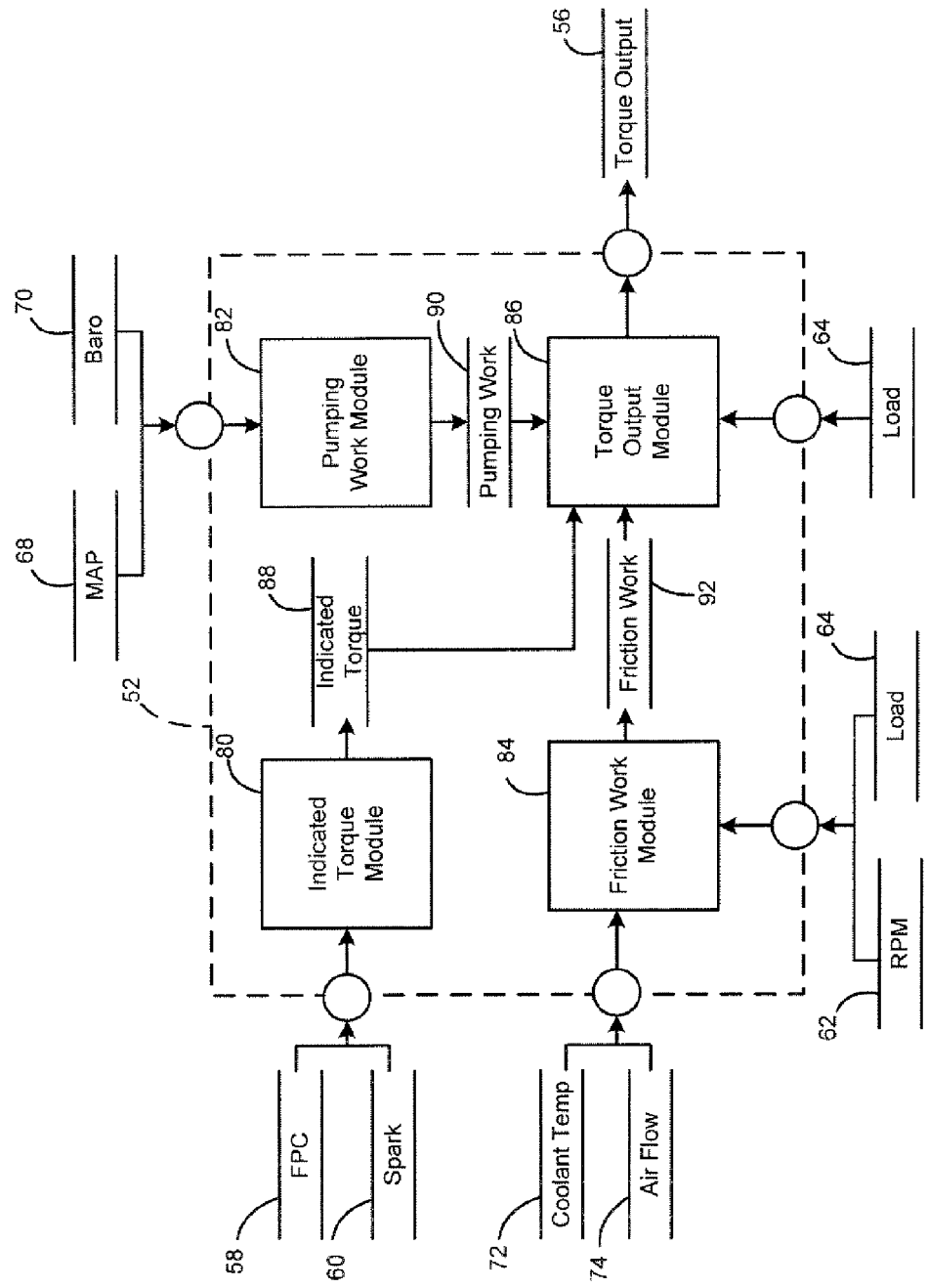
FIG. 3 is a dataflow diagram illustrating an engine torque module.

Referring now to FIG. 3, a dataflow diagram illustrates various embodiments of an engine torque module 52 in more detail. As can be appreciated, the sub-modules shown may be combined and/or further partitioned to similarly estimate a torque output 56. In various embodiments, the engine torque module 52 includes an indicated torque module 80, a pumping work module 82, a friction work module 84, and a torque output module 86. The indicated torque module 80 estimates an average indicated torque 88 based on fuel energy and engine displacement. More particularly, the indicated torque is estimated based on fuel per cycle per cylinder (FPC) 58, a location of spark timing (SPK) 60, a fuel heat value (HEAT), engine displacement (DISP), cylinders per revolution (CYLS), and revolutions per cycle (REVS). In various embodiments, indicated torque (IMEP) can be estimated based on the following equation:

$$IMEP = FPC(Gain) * ThermalEff(SPK)(Gain) * HEAT/DISP * CYLS * REVS.$$

Engine systems controlling to stoichiometric charge, estimate the FPC quantity based on actual cylinder airflow. A measurement or computation of airflow is directly proportional to the fueling requirement for a given condition. This relationship allows the control module 40 to estimate torque output for a fully fueled engine during conditions of reduced cylinder fueling by substituting Air/Cycle/Cylinder (APC) corrected to commanded A/F ratio. Engines equipped with AFM hardware use a compensated flow calculation when AFM hardware is active.

Figure 4:
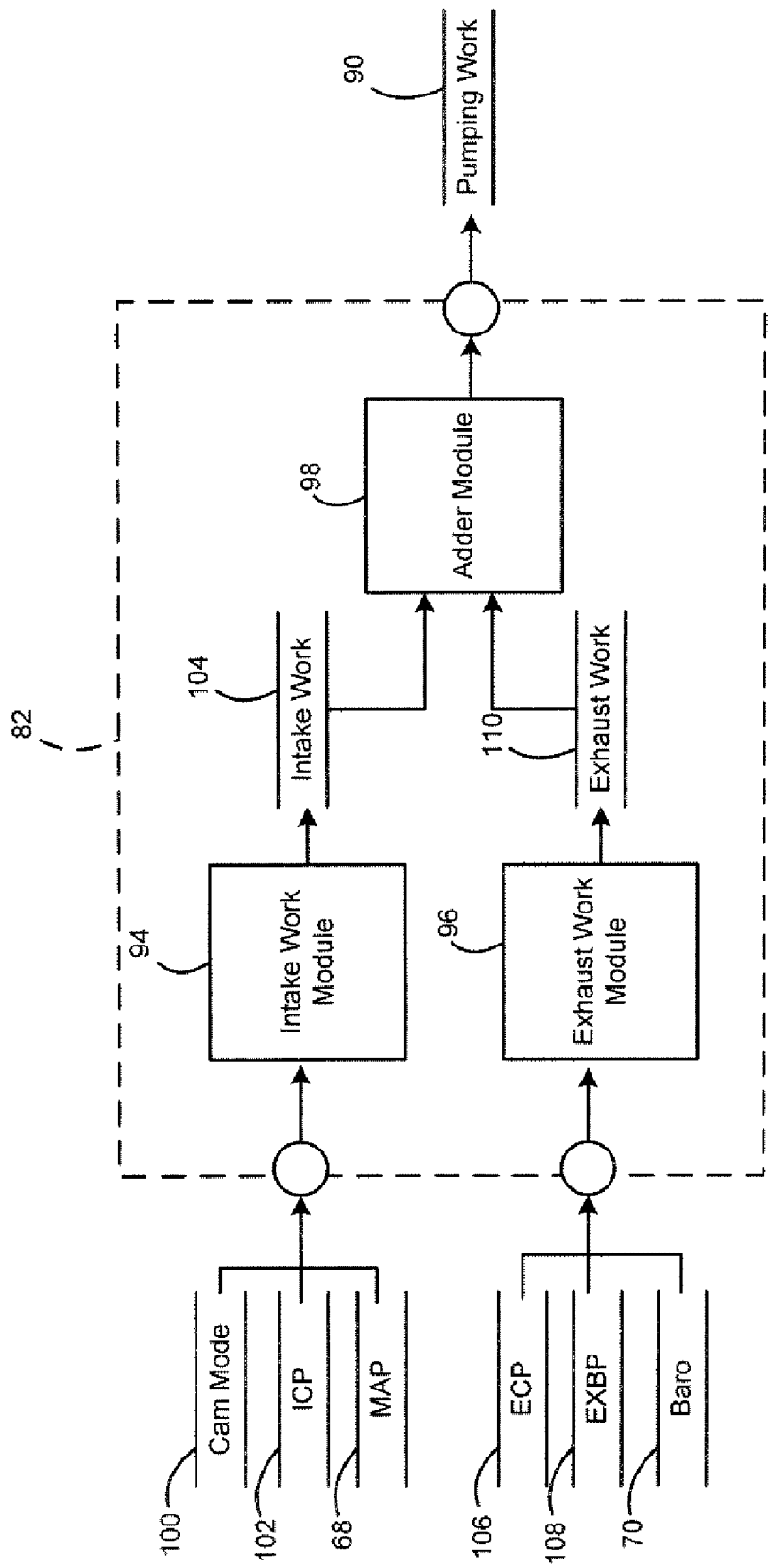
FIG. 4 is a dataflow diagram illustrating a pumping work module.

The pumping work module 82 estimates pumping work based on MAP 68 and exhaust back pressure. Barometric pressure 70 can be an adequate substitution for exhaust back pressure at low flow conditions experienced during FCO activity. A more sophisticated pumping computation can be performed based on a pumping work system as shown in FIG. 4. The dataflow diagram of FIG. 4 illustrates various embodiments of the pumping work module 82. As can be appreciated, the sub-modules shown may be combined and/or further partitioned to similarly estimate pumping work.

The more complicated pumping work module 82 of FIG. 4 can be used to estimate pumping work 90 for engine systems including variable valve timing or varying lift profiles. More specifically, intake work 104 and exhaust work 110 are estimated separately and associated with the pumping work 90. Intake work 104 is estimated by an intake work module 94 based on a cam mode 100, intake cam position (ICP) 102, and MAP 68. Exhaust work 110 is estimated by an exhaust work module 96 based on exhaust cam position 106, barometric pressure 70, and exhaust back pressure 108. The intake work 104 and the exhaust work 110 are then added together by an adder module 98 to equal the pumping work 90.

Referring back to FIG. 3, the friction work module 84 estimates friction work 92 based on engine speed 62 and coolant temperature 72. The friction work module adaptively corrects the estimated friction 92 work by measuring the energy needs of the engine at a controlled condition (e.g. engine idle, neutral gear, and air conditioning off). The friction work 92 can be adapted based on load 64 and airflow 74. The torque output module 86 estimates the torque output 56 based on the indicated torque (IMEP) 88, the pumping work (PMEP) 90, the friction work (FMEP) 92, and the parasitic load (LOAD) 64. In various embodiments, the torque output module 86 estimates the torque output (TRQ_OUT) based on the following equation:

$$TRQ\_OUT = (IMEP - PMEP - FMEP) * DISP - LOAD.$$

Where DISP is the displacement per cylinder.

Figure 5:
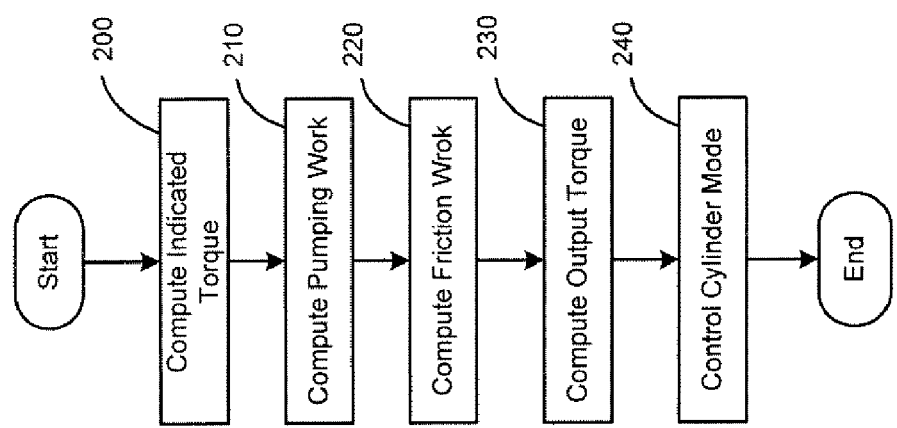
FIG. 5 is a flowchart illustrating a torque based FCO method.

Referring now to FIG. 5, a flowchart illustrates various embodiments of a torque based FCO method that may be performed by the control module 40. The method may be run periodically during engine operation. At 200, indicated torque is estimated based on charge energy. Pumping work is estimated based on MAP and barometric pressure at 210. Friction work is estimated based on engine speed and coolant temp at 220 and torque output is estimated based on the indicated torque, the pumping work, and the friction work at 230. The cylinder mode is controlled based on the torque output at 240.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. An engine control system, comprising:
    an engine torque module that estimates indicated torque based on charge energy, and that estimates torque output based on indicated torque, pumping work, and friction work; and
    a cylinder mode module that controls fuel cut-off and adjusts spark timing to an engine based on the torque output.

2. The system of claim 1 wherein the engine torque module estimates pumping work based on manifold absolute pressure and barometric pressure.

3. The system of claim 1 wherein the engine torque module estimates pumping work based on an exhaust work and an intake work wherein intake work is estimated based on cam mode, intake cam position, and manifold absolute pressure and wherein exhaust work is estimated based on exhaust cam position, barometric pressure, and exhaust back pressure.

4. The system of claim 1 wherein the engine torque module estimates the torque output based on the following equation:

TRQ_OUT=(IMEP−PMEP−FMEP)*DISP−LOAD, wherein TRQ_OUT denotes the torque output, IMEP denotes the indicated torque, PMEP denotes the pumping work, FMEP denotes the friction work, DISP denotes cylinder displacement, and LOAD denotes load.

5. The system of claim 1 wherein the engine torque module estimates indicated torque based on fuel per cylinder (FPC), a preferred location of spark timing (SPK), a fuel heat value (HEAT), engine displacement (DISP), cylinders per revolution (CYLS), and revolutions per cycle (REVS).

6. The system of claim 5 wherein the engine torque module estimates indicated torque (IMEP) based on the following equation:

IMEP=FPC(Gain)*ThermalEff(SPK)(Gain)*HEAT/DISP*CYLS*REVS.

7. The system of claim 1 wherein the engine torque module estimates friction work based on coolant temperature and engine speed.

8. The system of claim 7 wherein the engine torque module adapts the friction work based on load.

9. A method of controlling fuel cut-off to an internal combustion engine, comprising:
    estimating indicated torque based on charge energy;
    estimating a torque output based on the indicated torque, pumping work, and friction work; and
    controlling fuel cut-off and adjusting spark timing to the engine based on the torque output while controlling exhaust oxygen content.

10. The method of claim 9 further comprising estimating pumping work based on manifold absolute pressure and barometric pressure.

11. The method of claim 9 further comprising estimating pumping work based on manifold absolute pressure and exhaust back pressure.

12. The method of claim 9 further comprising estimating pumping work based on exhaust work and intake work, wherein intake work is estimated based on cam mode, intake cam position, and manifold absolute pressure and wherein exhaust work is estimated based on exhaust cam position, barometric pressure, and exhaust back pressure.

13. The method of claim 9 further comprising estimating the torque output based on the following equation:

TRQ_OUT=(IMEP−PMEP−FMEP)*DISP−LOAD, wherein TRQ_OUT denotes the torque output, IMEP denotes the indicated torque, PMEP denotes the pumping work, FMEP denotes the friction work, DISP denotes cylinder displacement, and LOAD denotes load.

14. The method of claim 9 further comprising estimating indicated torque based on fuel per cylinder (FPC), a location of spark timing (SPK), a fuel heat value (HEAT), engine displacement (DISP), cylinders per revolution (CYLS), and revolutions per cycle (REVS).

15. The method of claim 14 further comprising estimating indicated torque (IMEP) based on the following equation:

IMEP=FPC(Gain)*ThermalEff(SPK)(Gain)*HEAT/DISP*CYLS*REVS.

16. The method of claim 9 further comprising estimating friction work based on coolant temperature and engine speed.

17. The method of claim 16 further comprising adapting the friction work based on load.

* * * * *